June 20, 1950 — J. L. BROCK — 2,512,222
TRAILER HITCH BALL COVER
Filed March 5, 1948
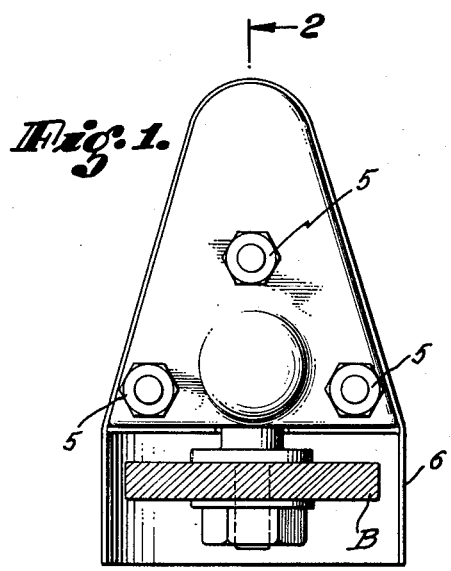
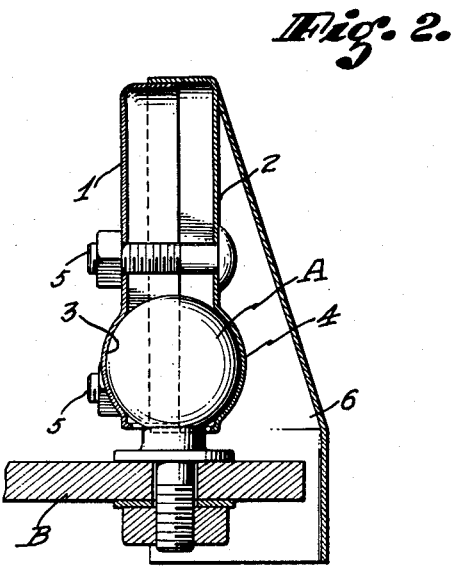
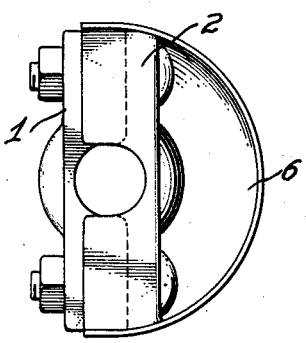
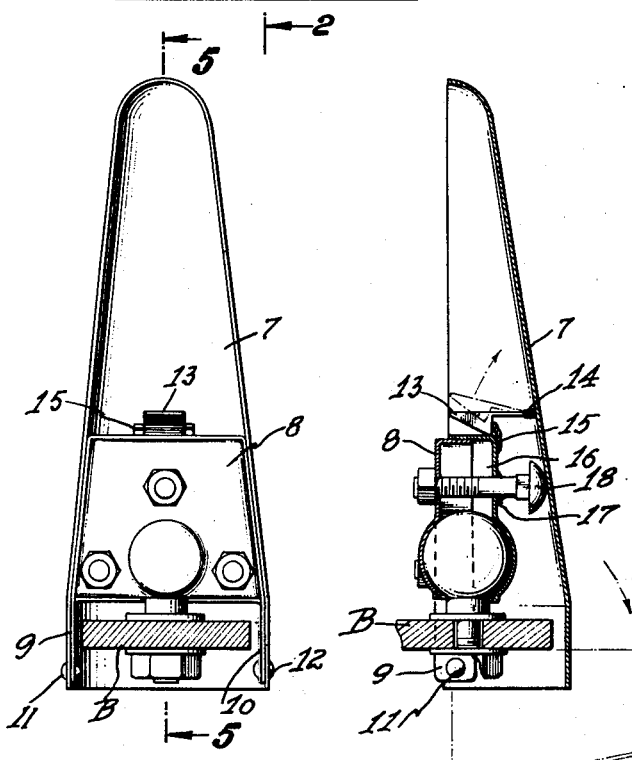
JOSEPH L. BROCK, INVENTOR.
BY O. O. Martin
ATTORNEY.

Patented June 20, 1950

2,512,222

UNITED STATES PATENT OFFICE 2,512,222

TRAILER HITCH BALL COVER

Joseph L. Brock, El Monte, Calif.

Application March 5, 1948, Serial No. 13,261

5 Claims. (Cl. 280—33.44)

This invention relates to a device for covering the ball commonly used in trailer hitches and is an improvement on the structure disclosed in my copending application, Serial No. 762,665, filed July 22, 1947, now abandoned.

One of the important features of the present invention is that the device shown in my said copending application is extended downward to cover the end of the pull bar of the trailer hitch on which the ball is mounted. A further object of the invention is to provide an ornamental cover which may be manually swung away from the body of the automobile in order to facilitate operation of the pivotally hung baggage compartment cover of the vehicle and so as to leave this compartment unobstructed for loading or unloading purposes. With these objects in view the invention resides in the combinations hereinafter described in detail and illustrated in the accompanying drawings, of which:

Fig. 1 is an elevational view of the inner surface of the device as it appears when mounted in position on a trailer hitch ball;

Fig. 2 is a substantially corresponding cross-sectional, side elevational view of the device taken through the vertical center thereof;

Fig. 3 is a bottom view of the structure of Figs. 1 and 2; and

Figs. 4 and 5 illustrate a modification of the device embodying therein features, the importance of which will become clear on the perusal of the following detailed description.

As illustrated in Figs. 1 to 3, the device comprises two main portions 1 and 2, both of which are recessed near the bottom thereof, as indicated at 3 and 4, to provide a spherical seat for the trailer hitch ball A. The two parts of the device are shown clamped together about the ball by means of a series of bolts 5. The structure so far described is substantially equivalent to the ball cover shown in Figs. 5 and 6 of my said copending application. In addition, it is important to note that an apron 6 is secured to the ball cover portion 2 to form an integral part thereof and the important feature of this apron is that it extends about and below the trailer hitch pull bar B completely to encompass the outer free end thereof. A protective shield is in this manner provided which not only will protect the main portions of the cover from damage due to collisions, but also will prevent dirt and other foreign matter from being pushed between the ball and its cover during operations of loading or unloading the rear end of the traction vehicle, to which the hitch ball is attached.

It is understood that the ball cover, such as herein considered, rises above the rear bumper close to the outer surface of the latter to harmonize with the guards commonly clamped in position on such bumpers for protective purposes and it is generally found desirable for ornamental purposes to extend the cover upward a considerable distance, substantially as indicated in Figs. 4 and 5. But while such structure may add considerably to the ornamental appearance of the rear end of the vehicle, it may also be found extending upward far enough to interfere with the opening movement of the baggage compartment cover of the vehicle, or at least to obstruct free passage into and out of the baggage compartment for loading or unloading purposes. In such cases, it may be found preferable to separate the apron from the main cover and to mount it in position for swinging movement thereon.

This combination is indicated in Figs. 4 and 5, in which the portion of the device within which the ball is clamped may remain substantially unchanged, but the apron 7 is a separate part which is pivotally mounted on downwardly extending flanges 9, 10 on the side walls of the cover portion 8 as indicated at 11, 12. When the apron 7 in this manner is mounted on the ball cover, it may be swung outwardly and downwardly in the direction of the arrows of Fig. 5 to clear the baggage compartment of the car. As indicated in light outline in Fig. 5, the apron is swung into a horizontal position, but it is to be understood that the swinging movement may be continued until it reaches a vertically pendent position so as to remain entirely out of the way.

It becomes necessary to lock the apron securely in the upright position of the drawings and this may be accomplished by mounting a pawl 13 on a hinge 14 of the apron for engagement with a lip 15 which rises from the cover portion 16. The pawl is held by gravity in engagement with the lip and it is merely required to lift it out of engagement with the lip in order to liberate the apron for outward swinging movement. But other locking means may be substituted, if preferred. As indicated in Fig. 5, the clamping bolt is shown projecting through the cover portion 16 far enough to serve as a stop for the apron in locking position and this bolt may be secured in position on the cover portion by a welding process, as indicated at 17, or in any other suitable manner. But a separate stop element may, of course, be mounted on the cover portion 16.

While I have hereinbefore described preferred forms of the invention, it is to be understood that modifications may be embodied within the scope of the claims hereto appended.

I claim:

1. The combination with the pull bar of a trailer hitch and the ball on the end thereof, of a cover seatable on and entirely enclosing said ball, means for clamping said cover in position on the ball, an apron pivotally fastened to the cover and extending downward freely to encompass the outer free end of said pull bar, and means for locking the apron in position on the cover against pivotal movement relative thereto.

2. The combination with the pull bar of a trailer hitch and the ball on the end thereof, of a cover seatable on and entirely enclosing said ball and upwardly extending therefrom, means for clamping said cover in position on the ball, an apron pivotally fastened to the cover and extending downward freely to encompass the outer free end of said pull bar, and means for locking the apron in position on the cover against pivotal movement relative thereto.

3. The combination with the pull bar of a trailer hitch and the ball on the end thereof, of a cover seatable on and entirely enclosing said ball, said cover having downwardly extending flanges, means for clamping said cover in position on the ball, an apron pivotally fastened to the cover flanges and extending downward freely to encompass the outer free end of said pull bar, and means for locking said apron in upright position on the cover.

4. The combination with the pull bar of a trailer hitch and the ball on the end thereof, of a cover seatable on and entirely enclosing said ball, said cover having downwardly extending flanges, means for clamping said cover in position on the ball, an apron pivotally fastened to the cover flanges and extending downward freely to encompass the outer free end of the pull bar, and manually operable means for locking said apron in upright position on the cover.

5. The combination with the pull bar of a trailer hitch and the ball on the end thereof, of a cover seatable on and entirely enclosing said ball, said cover having a lip rising from the top thereof, means for clamping said cover in position on the ball, an apron pivotally fastened to the cover and extending downward freely to encompass the outer free end of the pull bar, and a pawl on said apron for engagement with said lip to lock the apron in upright position on the cover.

JOSEPH L. BROCK.

REFERENCES CITED

The following references are of record in the file of this patent:

UNITED STATES PATENTS

| Number | Name | Date |
|---|---|---|
| 1,017,173 | Ryan | Feb. 13, 1912 |
| 1,094,046 | Adams | Apr. 21, 1914 |
| 1,568,768 | Reid | Jan. 5, 1926 |
| 2,342,907 | Stahl | Feb. 29, 1944 |